US007261270B2

(12) United States Patent
Chen et al.

(10) Patent No.: US 7,261,270 B2
(45) Date of Patent: Aug. 28, 2007

(54) MONITOR STAND

(75) Inventors: Yun-Lung Chen, Tu-Cheng (TW); Zhi-Qiang Li, Shenzhen (CN); Jian Hu, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 294 days.

(21) Appl. No.: 10/989,699

(22) Filed: Nov. 16, 2004

(65) Prior Publication Data
US 2005/0269477 A1 Dec. 8, 2005

(30) Foreign Application Priority Data
Jun. 7, 2004 (CN) .................. 2004 2 0047009 U

(51) Int. Cl.
*B65D 19/00* (2006.01)
*G06F 1/16* (2006.01)
(52) U.S. Cl. ................ 248/346.03; 248/424; 248/917; 361/683; 361/686; D14/376
(58) Field of Classification Search ........... 248/346.03, 248/917, 298.1, 639; 361/680–686, 726, 361/879; D14/367, 451; D06/396
See application file for complete search history.

(56) References Cited

U.S. PATENT DOCUMENTS

| 4,709,972 A * | 12/1987 | LaBudde et al. ........ 312/208.3 |
| 4,717,112 A * | 1/1988 | Pirkle .......................... 248/639 |
| 4,901,972 A * | 2/1990 | Judd et al. .................. 248/639 |
| 4,931,978 A * | 6/1990 | Drake et al. ................. 361/680 |
| 5,062,609 A * | 11/1991 | Hames et al. ............... 248/676 |
| 5,213,401 A * | 5/1993 | Hatcher .................... 312/208.1 |
| 5,561,589 A | 10/1996 | Mesfin et al. |
| 5,568,359 A | 10/1996 | Cavello et al. |
| 5,588,727 A * | 12/1996 | D'Agaro ..................... 312/283 |
| 5,745,341 A | 4/1998 | Wolff et al. |
| 6,036,288 A * | 3/2000 | Shih ........................ 312/223.3 |
| 6,049,454 A | 4/2000 | Howell et al. |
| 6,061,234 A * | 5/2000 | Broder et al. ............... 361/686 |
| 6,536,728 B1 * | 3/2003 | Hagglund et al. ........ 248/286.1 |
| 6,833,988 B2 * | 12/2004 | Kamphuis et al. .......... 361/681 |
| 2003/0161096 A1 * | 8/2003 | Yin ............................. 361/683 |

* cited by examiner

*Primary Examiner*—Anita M. King
(74) *Attorney, Agent, or Firm*—Wei-Te Chung

(57) ABSTRACT

A monitor stand includes an upper support member (100) for supporting a monitor thereon, and a lower support member (200). The lower support member comprises a fixed piece (270), a slidable piece (210) slidably attached to the fixed piece for supporting a notebook computer connected to the monitor, the slidable piece being slidable in a first direction, a clutch (243) movable between the fixed piece and the slidable piece in a second direction generally perpendicular to the first direction to selectively engage the fixed piece so that the slidable piece is tightly held in place relative to the fixed piece, and a button (250) enabling the clutch to be disengaged from the fixed piece so that the slidable piece is free to slide relative to the fixed piece.

19 Claims, 7 Drawing Sheets

MONITOR STAND

BACKGROUND OF THE INVENTION

1. Field of the Invention

The present invention relates to a monitor stand, and more particularly to a monitor stand which has increased ease of use.

2. Description of the Related Art

In spite of portability of notebook computers, the notebook computers are less powerful than desktop computers. For example, displays of the notebook computers are too small to be used in some special occasions. A monitor has to be introduced to enhance the function of the notebook computer for desktop use. Typically, a docking system such as a port replicator is provided to serve as an interface between notebook computer and desktop peripheral devices including a printer, a scanner, a modem, etc. in addition to a monitor.

When a port replicator and a monitor are used, a monitor stand is often introduced to support the port replicator and the monitor for saving desktop space. Such monitor stand has been described respectively in U.S. Pat. Nos. 5,561,589, 5,568,359, 5,745,341, and 6,049,454. However, the notebook and the port replicator are typically sheltered from a user's eyesight in the monitor stand. It is inconvenient for the user to connect or disconnect the notebook computer to or from the port replicator. Furthermore, the port replicator is typically fixed in the monitor stand. The notebook computer connected to the port replicator is unable to be moved with respect to the monitor stand in response to different space limitations or preferences of users.

SUMMARY OF THE INVENTION

Accordingly, an object of the present invention is to provide a monitor stand which has increased ease of use.

To achieve the above object, a monitor stand in accordance with the present invention comprises an upper support member for supporting a monitor thereon, and a lower support member. The lower support member comprises a fixed piece, a slidable piece slidably attached to the fixed piece for supporting a notebook computer connected to the monitor, the slidable piece being slidable in a first direction, a clutch movable between the fixed piece and the slidable piece in a second direction generally perpendicular to the first direction to selectively engage the fixed piece so that the slidable piece is tightly held in place relative to the fixed piece, and a button enabling the clutch to be disengaged from the fixed piece so that the slidable piece is free to slide relative to the fixed piece.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
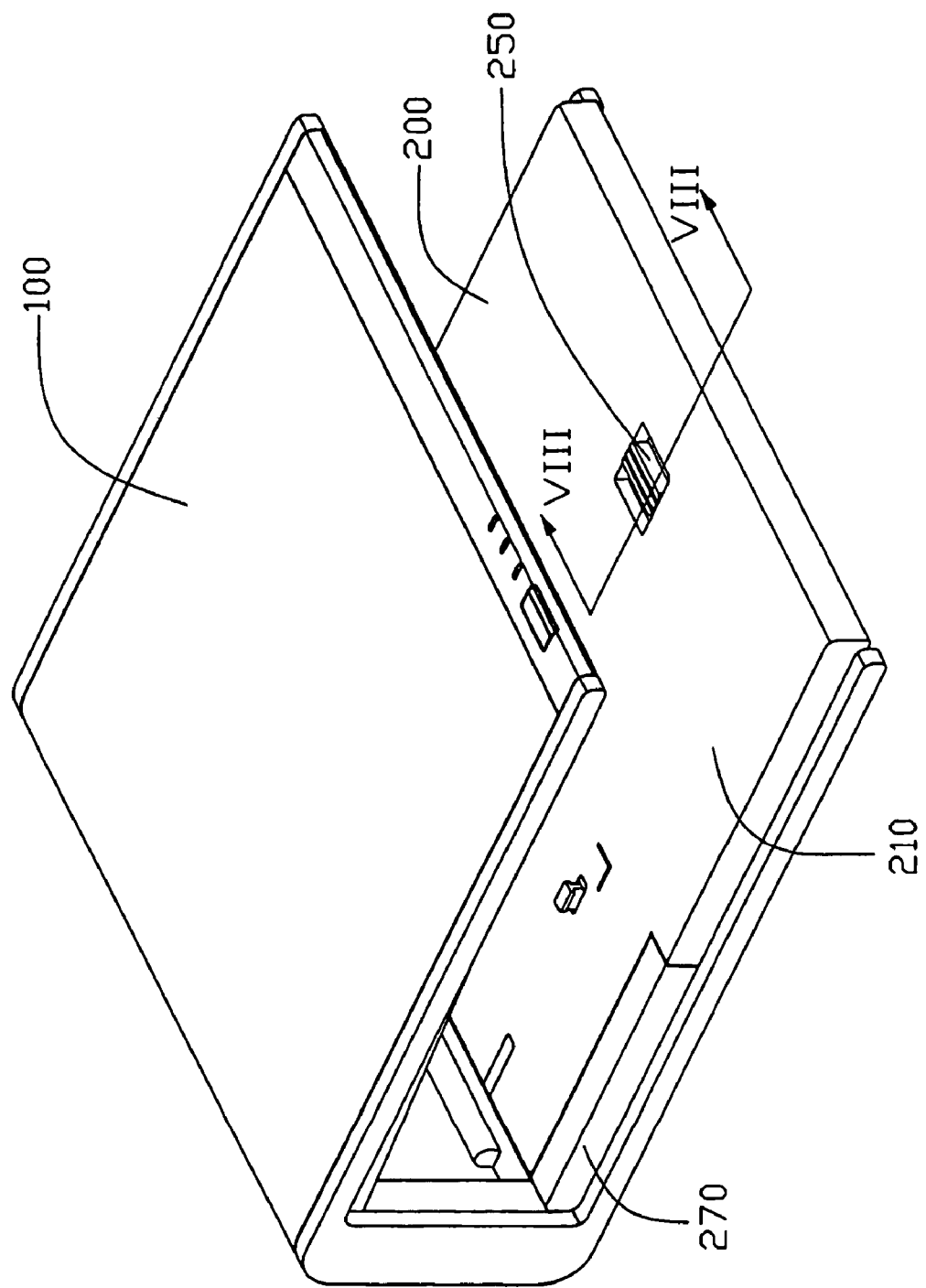
FIG. 1 is an isometric view of a monitor stand in accordance with a preferred embodiment of the present invention, the monitor stand comprising an upper support member, and a lower support member having a slidable piece, a clutch (not visible), a button, and a fixed piece.
Figure 10:
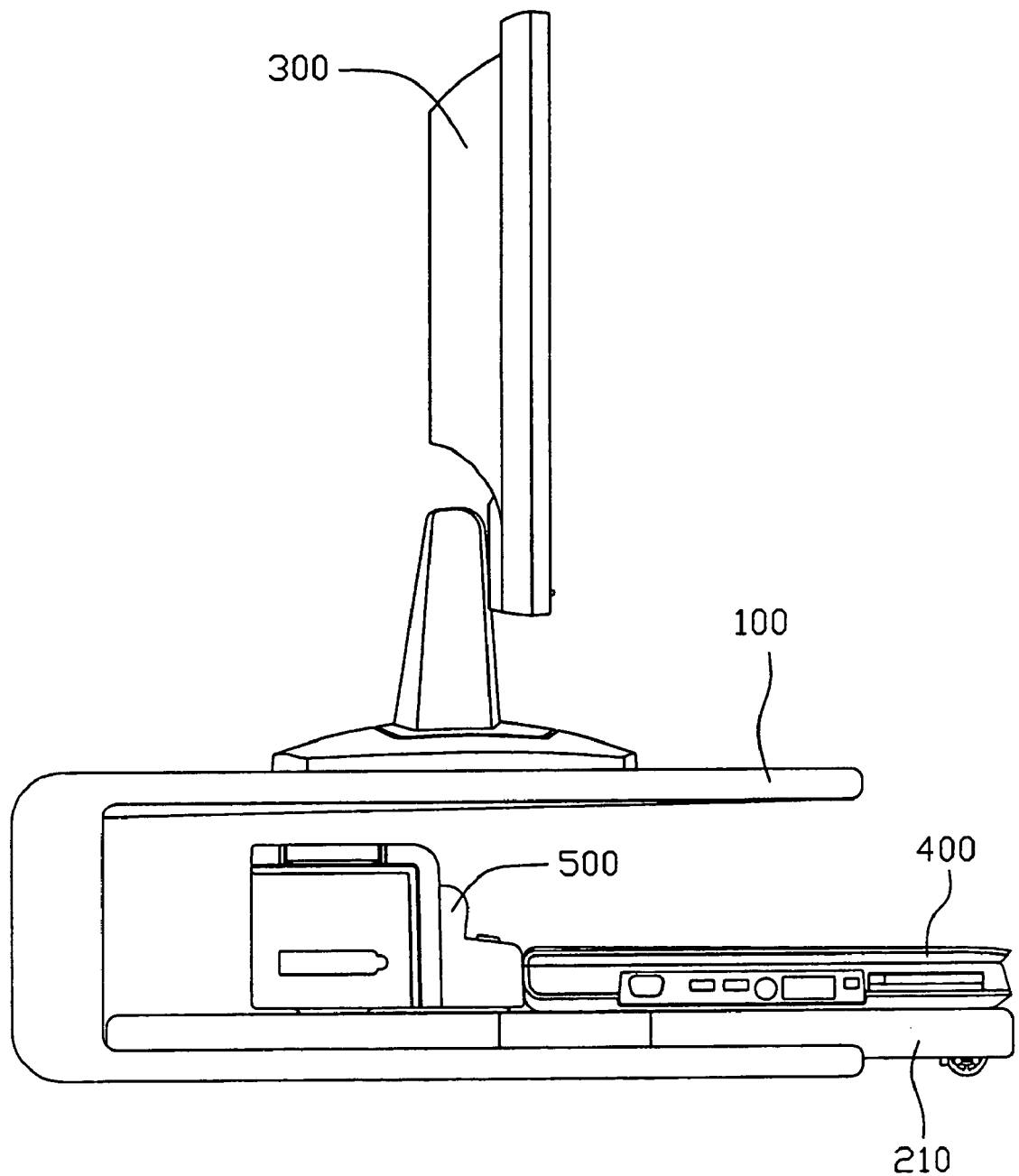
FIG. 10 is a side view of the monitor stand, showing the monitor stand in use with a monitor, a docking device and a notebook computer.

Referring to FIGS. 1 and 10, a monitor stand in accordance with a preferred embodiment of the present invention comprises an upper support member 100, and a lower support member 200. The upper support member 100 is adapted for supporting a display device like a monitor 300 thereon, and the lower support member 200 is adapted for supporting a docking device 500 on a rear portion thereof and a portable device like a notebook computer 400 docked to the docking device 500 on a front portion thereof. The docking device 500 is adapted to connect the notebook computer 400 to the monitor 300 and/or other peripheral devices such as printers, modems, etc.

The lower support member 200 comprises a slidable piece 210, a button 250 movably embedded in the slidable piece 210 and a fixed piece 270 generally attached below the slidable piece 210. The notebook computer and the docking device are positioned on the slidable piece 210.

Figure 2:
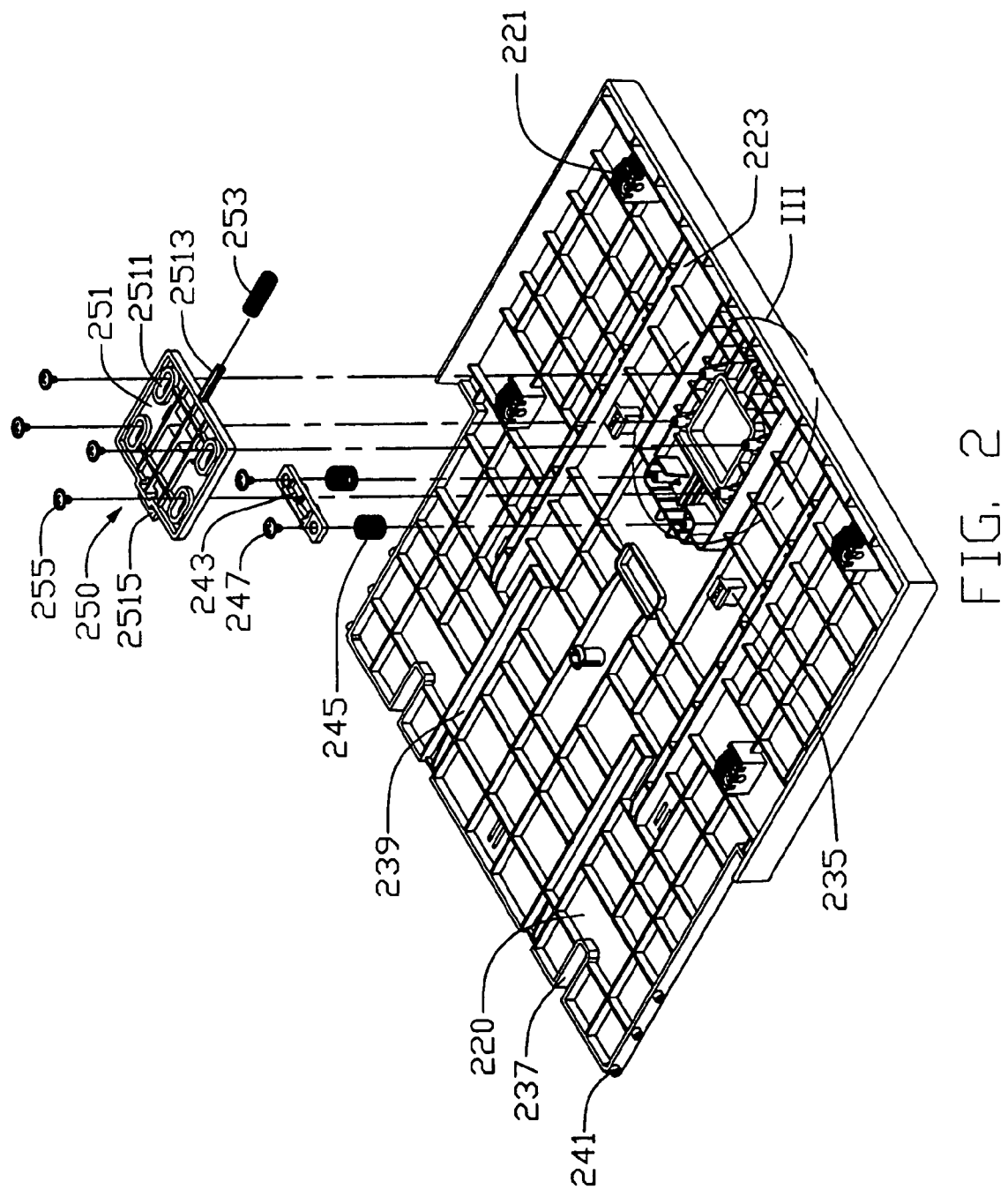
FIG. 2 is an exploded view of the slidable piece, the clutch and the button, but viewed from another aspect.
Figure 3:
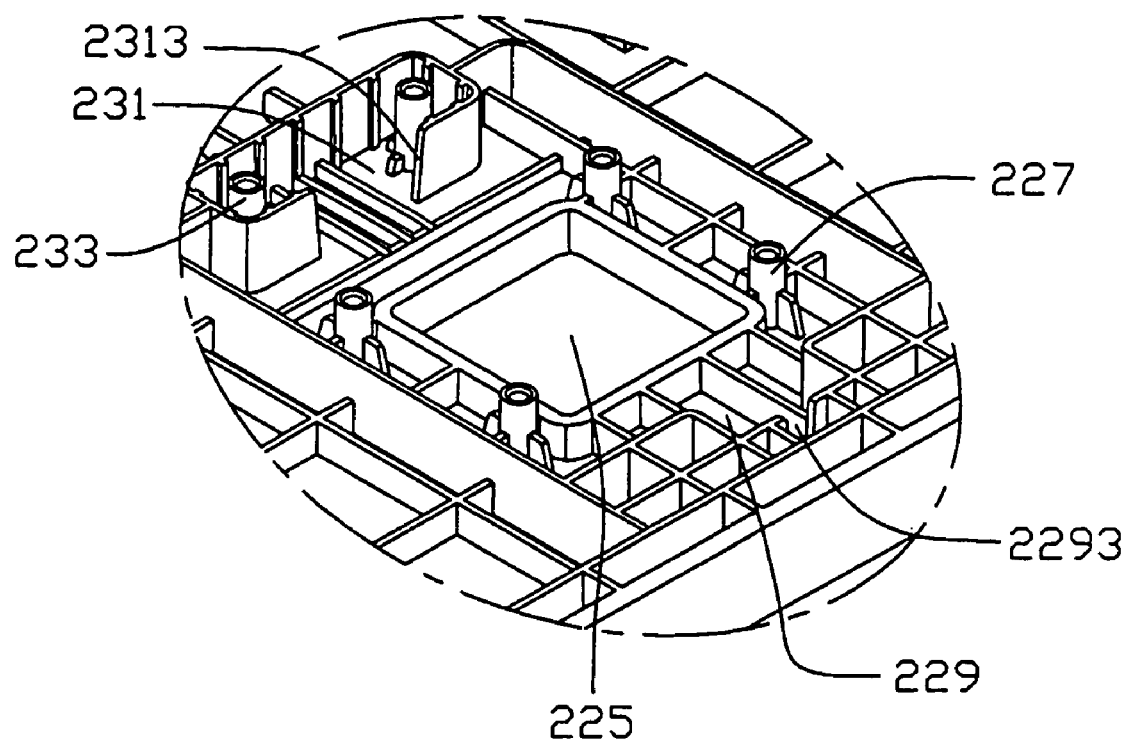
FIG. 3 is an enlarged view of a circled portion III of FIG. 2.

Referring to FIGS. 2 and 3, the slidable piece 210 comprises a plate 220 and a clutch 243. The plate 220 comprises a relative broad front portion and a relative narrow rear portion. Four wheels 221 are attached to a lower surface of the front portion of the plate 220. The wheels 221 are located adjacent four corners of the front portion of the plate 220 respectively. A pair of spaced longitudinal rails 223 is extended from a front edge of the front portion to the rear portion of the plate 220. A button hole 225 is defined in the front portion adjacent the front edge of the plate 220 between the rails 223. Four sockets 227 depend from around the button hole 225, each having an internal threaded hole defined therein. A chamber 229 is defined between the front edge and the button hole 225 of the plate 220, for receiving a coil spring 253 therein. The chamber 229 defines a cutout 2293 proximal to the front edge of the plate 220.

An accommodation space 231 is defined at rear of the button hole 225 in the front portion of the plate 220 by an integral wall, for accommodating the clutch 243 therein. A pair of two spaced sockets 233 depends from the plate 220 in the accommodation space 231. An entrance 2313 is defined in the integral wall in communication with the accommodation space 231. A pair of spaced catches 235 is formed adjacent the accommodation space 231 respectively. A pair of channels 237 is defined from a rear edge of the rear portion of the plate 220. A pair of longitudinal slots 239 is defined in the rear portion of the plate 220. A plurality of pins 241 is protruded outwardly from each side edge of the rear portion of the plate 220.

Figure 4:
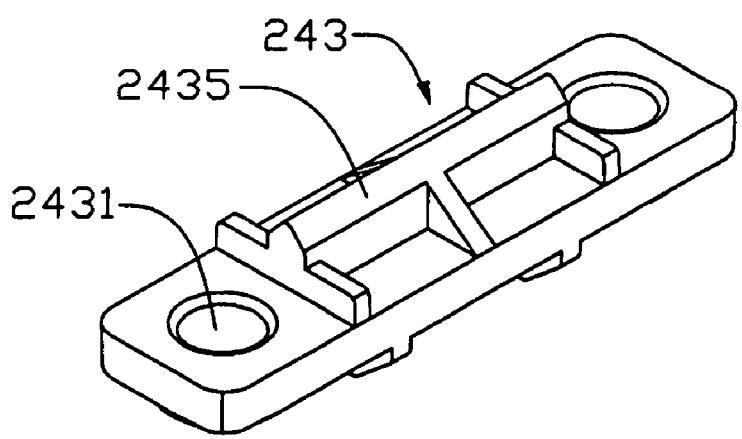
FIG. 4 is an enlarged view of the clutch of FIG. 2.
Figure 5:
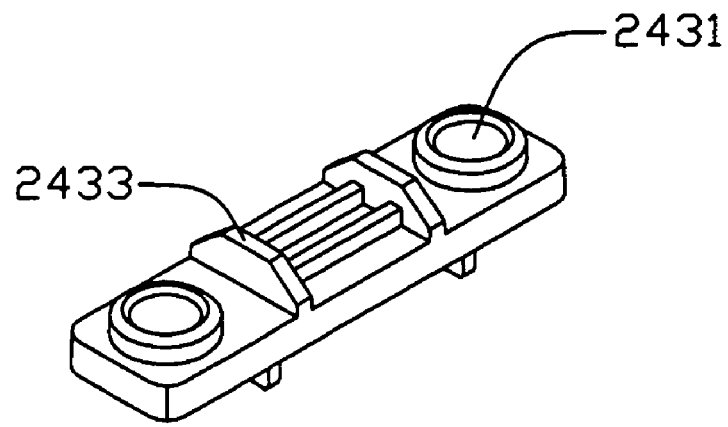
FIG. 5 is an enlarged view of the clutch of FIG. 2, but viewed from another aspect.

Referring to FIGS. 4 and 5, the clutch 243 defines a pair of through-holes 2431 in opposite ends thereof respectively, with a pair of collars formed on an upper surface thereof corresponding to the through holes 2431. Referring back to FIG. 1, a pair of coil springs 245 is provided to be positioned between the clutch 243 and the plate 220 in the accommodation space 231, with sockets 233 extended through the springs 245 respectively. A pair of screws 247 is provided to securely attach the clutch 243 to the sockets 233. A pair of ribs 2433 is formed on the upper surface of the clutch 243 between the collars. A wedge-shaped protrusion 2435 is formed downwardly from a lower surface of the clutch 243.

Figure 6:
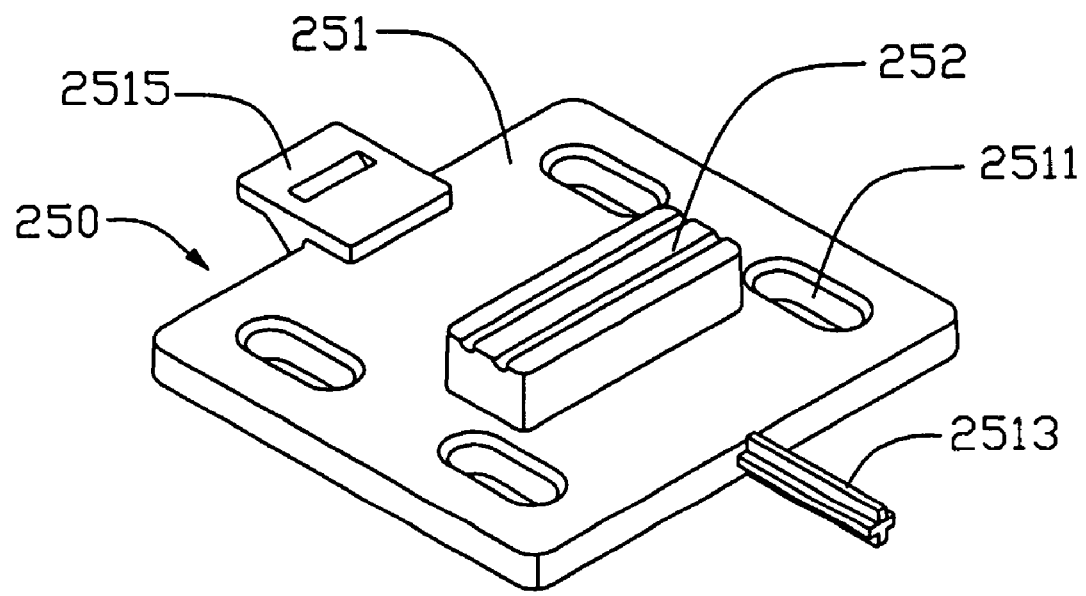
FIG. 6 is an enlarged view of the button of FIG.2, but viewed from another aspect.

Referring to FIG. 6, the button 250 comprises a main body 251, and a handgrip 252 formed on an upper surface of the main body 251, corresponding to the button hole 225 defined in the slidable piece 210. Four slots 2511 are defined in the main body 251 at four corners thereof respectively, corresponding to the sockets 227 of the slidable piece 210. A post 2513 is extended forwardly from a front end of the main body 251, for cooperating with the chamber 229 of the plate 220 of the slidable piece 210 to retain the coil spring 253 in the chamber 229. A block 2515 is formed rearward from a rear end of the main body 251 of the button 250.

Figure 7:
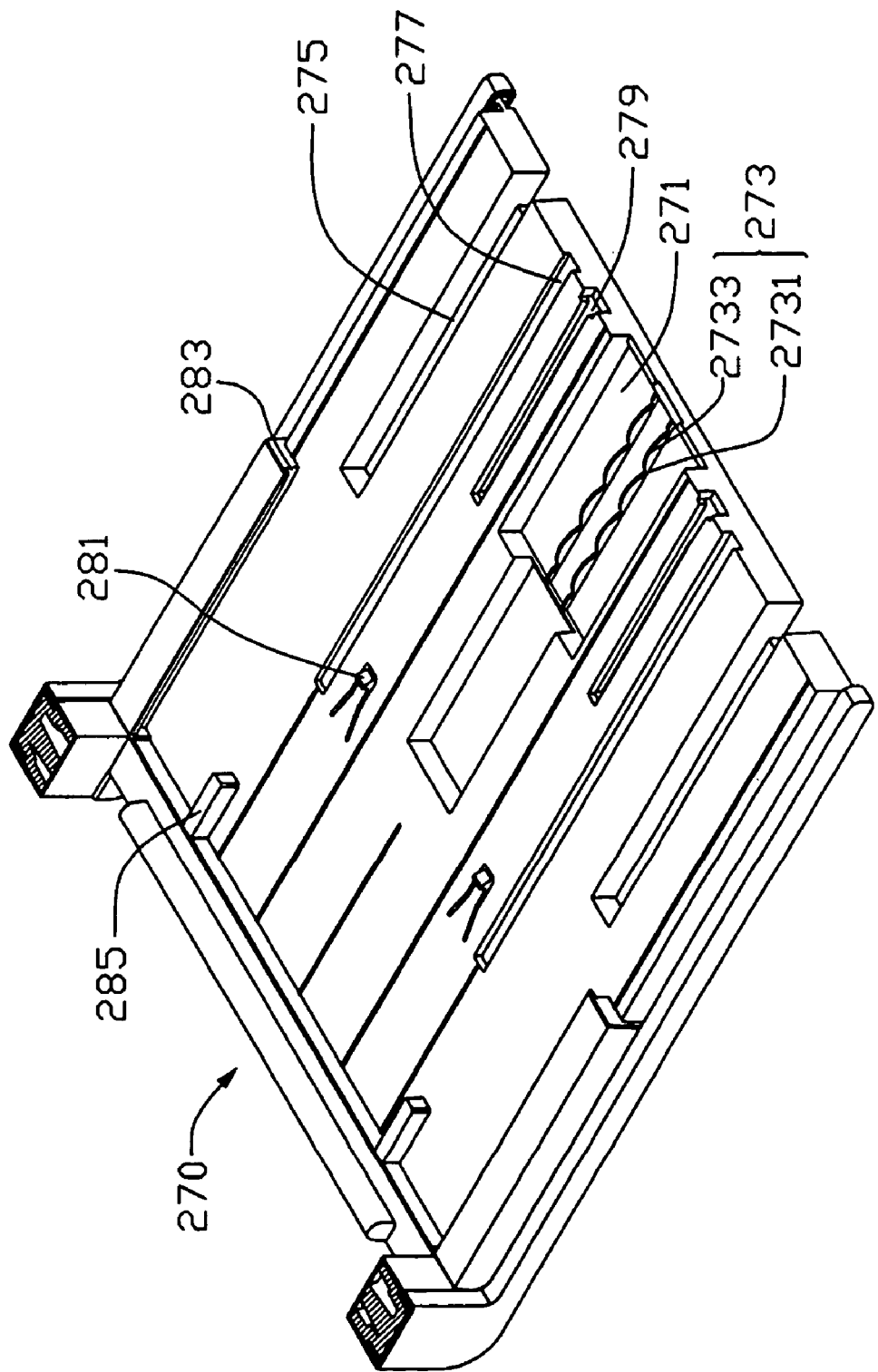
FIG. 7 is an isometric view of the fixed piece of the lower support member of FIG. 1.

Referring to FIG. 7, a cavity 271 is defined in an front end portion of the fixed pieces 270. A pair of parallel slideways 273 is protruded upwardly from a bottom of the cavity 271. Each slideway 273 comprises a plurality of concaves 2731 and convexes 2733, corresponding to the clutch 243 of the slidable piece 210, every two neighboring concaves 2731 sandwiching one convex 2733 therebetween. A slot 275 is defined adjacent each side edge of the fixed member 270, for supporting corresponding wheels 221 of the slidable piece 210. A longitudinal rail guideway 277 is defined adjacent each slot 275, corresponding to rails 223 of the slidable piece 210. A pair of catch apertures 279 is defined in the fixed piece 270 between the cavity 271 and the gudieways 277 respectively, corresponding to the catches 235 of the slidable piece 210. A length of each catch aperture 279 is shorter than a length of corresponding rail guideway 277.

A pair of elastic hooks 281 is formed at rear of the catch apertures 279 adjacent rear ends of the rail guideways 277 respectively, for clasping the slots 239 of the slidable piece 210 respectively. A pair of pin guideways 283 is defined in rear portion of the fixed piece 270 adjacent side edges thereof, corresponding to pins 241 of the slidable piece 210. A pair of guiding pieces 285 is formed adjacent rear edge of the fixed piece 270, corresponding to the channels 237 of the slidable piece 210.

In assembly of the lower support member 200, the sockets 233 are relatively extended in sequence through the coil springs 245 and the through-holes 2431 of the clutch 243 respectively. The screws 247 are engaged in the sockets 233 respectively to secure the clutch 243. The post 2513 of the button 250 is extended through the coil spring 253. The button 250 and the coil spring 253 are together placed on the lower surface of the plate 220 of the slidable piece 210. The handgrip 252 is extended in the button hole 225, the sockets 227 are respectively received in the slots 2511 of the main body 251 of the button 250, the coil spring 253 are received in the chamber 229 of the plate 220 of the slidable piece 210, and a free end of the post 2513 of the button 250 is extended through the cutout 2293 of the plate 220 of the slidable piece 210. Four screws 255 are threaded in corresponding sockets 227 of the slidable piece 210 to slidably attach the button 250 to the lower surface of the slidable piece 210.

The combined slidable piece 210 and button 250 is then placed on the fixed piece 270, with the pins 241, the wheels 221 and the rails 223 of the slidable piece 210 in alignment with corresponding pin guideways 283, slots 275 and rail guideways 277 of the fixed piece 270 respectively. The slidable piece 210 is then pushed rearward until the guiding pieces 285 and the hooks 281 of the fixed piece 270 are respectively received in corresponding channels 237 and slots 239 of the slidable piece 210. Simultaneously, the rails 223 of the slidable piece 210 are received in corresponding rail guideways 277 of the fixed piece 270 in its full length, and the catches 235 of the slidable piece 210 reach rear ends of the catch apertures 279 of the fixed piece 270 respectively.

Figure 8:
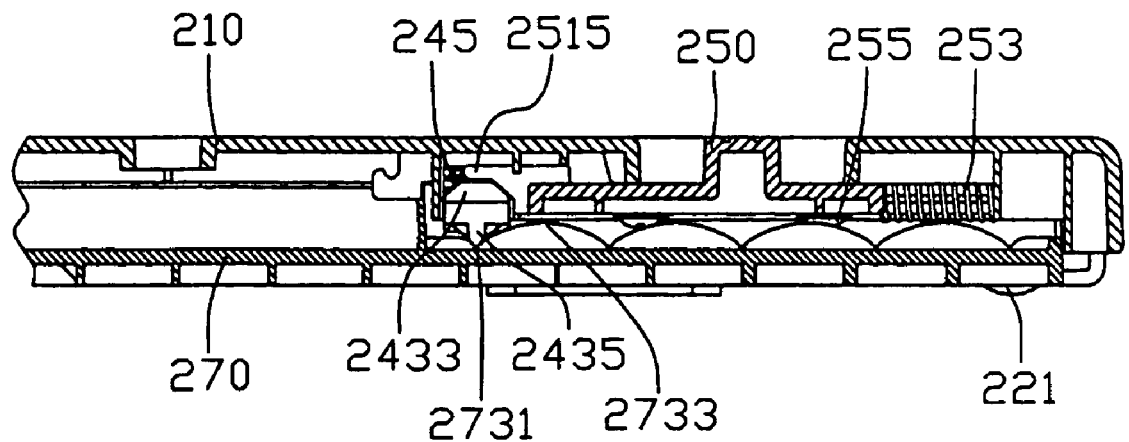
FIGS. 8 and 9 are cross-sectional views of FIG. 1 taken along line VIII-VIII thereof, showing the process of moving the slidable piece with respect to the fixed piece.

FIG. 8 shows the slidable piece 210 is at a first position. The protrusion 2435 of the clutch 243 of the slidable piece 210 is engaged in first concaves 2731 of the slideways 273 of the fixed piece 270, the block 2515 of the button 250 is inserted through the entrance 2313 of the accommodation space 231 between the rib 2433 of the clutch 243 and the lower surface of the slidable piece 210 for prevention of the clutch 243 entering the accommodation space 231. The slidable piece 210 is thereby secured at the first position.

Figure 9:
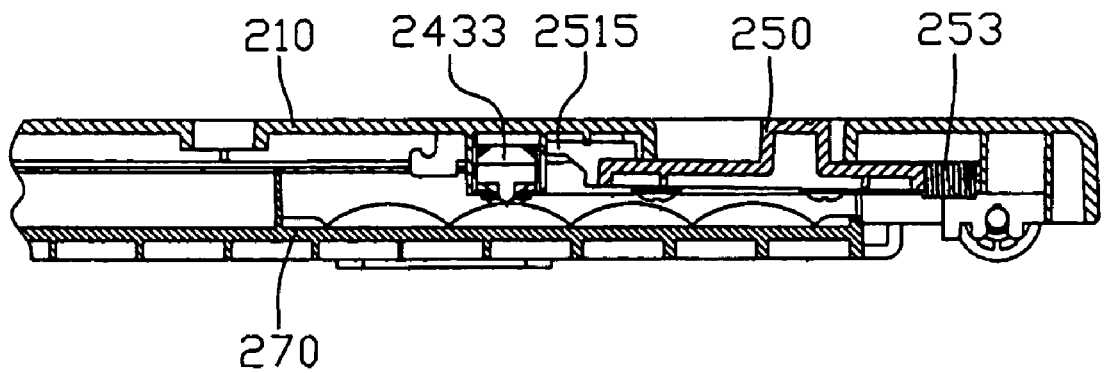

Referring to FIG. 9, in use of the monitor stand, the button 250 is pulled by the handgrip 252 toward the front end of the slidable piece 210 for retracting the block 2515 back from the accommodation space 231 of the slidable piece 210, and the coil spring 253 is compressed in the chamber 229 of the slidable piece 210. The button 250 is held on, and the sldiable piece 210 is then pulled outwardly from under the upper support member 100, with the wheels 221 thereof rolling along corresponding slots 275 of the fixed piece 270 to facilitate movement of the sldiable piece 210. The clutch 243 is disengaged from the first concaves 2731 of the slideways 273 of the fixed piece 270, and is gradually urged upwardly into the accommodation space 231 of the slidable piece 210 by first convexes 2733 of the slideways 273 of the fixed piece 270. The coil springs 245 disposed in the accommodation space 231 are gradually compressed by the clutch 243. FIG. 9 shows the clutch 243 arrives at summits of the first convexes 2733 of the slideways 273 of the fixed piece 270, and the coil springs 245 are compressed to the most.

The slidable piece 210 is continually moved forwardly, the clutch 243 gets over the summits of the first convexes 2733 of the slideways 273 of the fixed piece 270, and the coil springs 245 gradually restore to drive the clutch 243 downwardly until the protrusion 2435 of the clutch 243 is engaged in sequent second concaves 2733 of the slideways 273 of the fixed piece 270. The button 250 is then released, and the coil spring 253 restores to drive the block 2515 of the button 250 to enter between the ribs 2433 of the clutch 243 and the lower surface of the slidable piece 210. The clutch 243 is prevented from moving upwardly away from the second concaves 2731 of the slideways 273 of the fixed piece 273 by the block 2515 of the button 250, thereby the slidable piece 210 is securely held at a second position relative to the fixed piece 270. If desired, the slidable piece 210 can be moved and fixed at other sequent concaves 2733 of the slideways 273 of the fixed piece 270.

In this embodiment, see FIGS. 8 and 9, the slidable piece 210 and the button 250 slide in a plane generally parallel to a bottom surface of the fixed piece 270. The clutch 243 slides in a direction generally perpendicular to the plane.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A monitor stand, comprising:
   an upper support member for supporting a monitor thereon; and
   a lower support member comprising:
   a fixed piece;
   a slidable piece slidably attached to the fixed piece for supporting a notebook computer connected to the monitor, the slidable piece being slidable in a plane generally parallel to a bottom surface of the fixed piece;
   a clutch movable between the fixed piece and the slidable piece in a direction generally perpendicular to the plane to selectively engage the fixed piece so that the slidable piece is tightly held in place relative to the fixed piece; and
   a button enabling the clutch to be disengaged from the fixed piece so that the slidable piece is free to slide relative to the fixed piece.

2. The monitor stand as claimed in claim 1, wherein the button is capable of preventing the clutch to be disengaged from the fixed piece when the slidable piece is tightly held in place.

3. The monitor stand as claimed in claim 2, wherein the button comprises a block capable of being retractably extended between the clutch and the slidable piece to prevent the clutch to be disengaged from the fixed piece when the slidable piece is tightly held in place.

4. The monitor stand as claimed in claim 3, wherein the slidable piece defines an accommodating space, the clutch is detachably attached in the accommodating space, and at least one elastic member is arranged in the accommodating space to facilitate movement of the clutch in the second direction.

5. The monitor stand as claimed in claim 4, wherein said elastic member is a coil spring.

6. The monitor stand as claimed in claim 4, wherein the accommodating space is defined by an integral wall, and an entrance is defined in the wall corresponding to the block of the button.

7. The monitor stand as claimed in claim 3, wherein the button is slidably attached to a lower surface of the slidable piece, and an elastic member is attached between the button and the slidable piece.

8. The monitor stand as claimed in claim 7, wherein the button further comprises a handgrip extending upwardly through a button hole of the slidable piece.

9. The monitor stand as claimed in claim 1, wherein the clutch comprises a protrusion, the fixed piece comprises at least one slideway, and said slideway comprises at least one convex for blocking the protrusion of the clutch and at least one concave besides the at least one convex for receiving the protrusion of the clutch.

10. The monitor stand as claimed in claim 9, wherein the protrusion of the clutch is generally wedge-shaped.

11. A monitor stand comprising:
    an upper support member for supporting a monitor thereon; and
    a lower support member comprising:
    a fixed piece connected to the upper support member, the fixed piece comprising at least one slideway having a plurality of concaves;
    a slidable piece slidably attached to the fixed piece for supporting a notebook computer electrically connected to the monitor;
    a clutch movably attached to the slidable piece, the clutch comprising a protrusion selectively engaging one of the concaves; and
    a button controlled to engage the clutch to prevent movement of the clutch thereby holding the slidable piece in place;
    wherein said slideway of the fixed piece further comprises a plurality of convexes, and each two neighboring concaves sandwich one of the convexes.

12. The monitor stand as claimed in claim 11, wherein the slidable piece defines an accommodating space, the clutch is detachably attached in the accommodating space, and at least coil spring is arranged in the accommodating space to facilitate movement of the clutch.

13. The monitor stand as claimed in claim 11, wherein the button is slidably attached to a lower surface of the slidable piece, and a coil spring is attached between the button and the slidable piece.

14. The monitor stand as claimed in claim 13, wherein the button comprises a block capable of being retractably extended between the clutch and the slidable piece to prevent movement of the clutch between the slidable piece and the fixed piece.

15. A stand for accommodating at least two devices, comprising:
    upper support member for supporting one of said at least two devices thereon; and
    a lower support member spaced from said upper support member to define an accommodating space therebetween for supporting another of said at least two devices in said space, said lower support member comprising a fixed piece and a slidable piece slidably attached to said fixed piece, said slidable piece movable out of said space so as to provide another accommodating space next to said slidable piece for said another of said at least two devices;
    a clutch disposed in said slidable piece and engagable with said fixed piece so as to control a relative position and movement of said slidable piece to said fixed piece; and
    a button disposed next to said clutch to enable said control of said clutch to said relative position and movement of said slidable piece;
    wherein said button comprises a block capable of being retractably extended between said clutch and said slidable piece to prevent movement of said clutch between said slidable piece and said fixed piece.

16. The stand as claimed in claim 15, wherein said slidable piece defines an accommodating space for receiving said clutch, and at least one elastic member is arranged in said accommodating space to urge said clutch engage with said fixed piece.

17. The stand as claimed in claim 16, wherein said elastic member is a coil spring.

18. The monitor stand as claimed in claim 16, wherein said accommodating space defines an entrance for said block of said button extending thereinto.

19. The monitor stand as claimed in claim 15, wherein said button is slidably attached to a lower surface of said slidable piece, and an elastic member is attached between said button and said slidable piece for restricting movement of said block between said clutch and said slidable piece.

* * * * *